Dec. 5, 1961     H. W. LYONS     3,011,456
ARTICLE HANDLING APPARATUS Filed Feb. 11, 1960     6 Sheets-Sheet 1

FIG. 1

INVENTOR.
Hubert W. Lyons,
BY Paul & Paul
ATTORNEYS.

Dec. 5, 1961 H. W. LYONS 3,011,456
ARTICLE HANDLING APPARATUS
Filed Feb. 11, 1960 6 Sheets-Sheet 4

FIG. 4.

INVENTOR.
Hubert W. Lyons,
BY Paul & Paul
ATTORNEYS.

United States Patent Office 3,011,456
Patented Dec. 5, 1961

3,011,456
ARTICLE HANDLING APPARATUS
Hubert W. Lyons, Penn Wynne, Pa., assignor to Merck & Co., Inc., Rahway, N.J., a corporation of New Jersey
Filed Feb. 11, 1960, Ser. No. 8,014
20 Claims. (Cl. 104—172)

This invention relates to article handling apparatus, and more particularly to automatically operable conveyor systems. More particularly this invention relates to mechanisms for controlling the movement of articles in connection with continuously moving chain conveyors.

It is an object of this invention to provide a stop and release mechanism for work objects moved by a continuously moving chain driven conveyor whereby an individual work object can be stopped at any selected point along the conveyor line.

It is another object of this invention to provide a stop and release mechanism for use in connection with a chain conveyor of the kind referred to whereby any individual work object may be retained at the point at which it has been stopped so long as it may be desired, without any interruption in the conveyor drive.

It is another object of this invention to provide a stop and release mechanism in connection with a chain driven endless conveyor which is simple to construct, easy to install, and which requires a minimum of maintenance and adjustment.

It is another object of this invention to provide a stop and release mechanism for use with an endless chain conveyor which completely avoids the use of precision parts and which is yet both reliable, strong and durable, thereby affording greatly increased economy in construction, maintenance and use.

It is another object of this invention to provide a stop and release mechanism in connection with an endless chain driven conveyor which may be operated either electrically or mechanically, with or without manual controls.

It is another object of this invention to provide a stop and release mechanism in connection with an endless chain conveyor which is adaptable to a very great variety of different kinds of operations performed in connection with said conveyor and which greatly increases the efficiency of said operations over that experienced heretofore.

Other objects and attendant advantages of the invention will become apparent hereinafter, and in the drawings wherein.

The following description is directed to specific forms of the invention illustrated in the drawings and is not intended to be addressed to the scope of the invention as exemplified thereby.

Adverting herewith to the specific form of the invention illustrated in the drawings, the numbers 10 and 11 designate respectively the power drive tube and carrier tube of an endless conveyor of the kind with which this invention is concerned. Located within the tube 11 are a plurality of carrier elements 12 having at each end thereof a double roller 13 mounted for rotation on a rivet pin 14. Secured to the carrier element 12 is a depending hook element having a shank 15 and hook 16 from which is suspended a basket 17 by means of a handle 18. Welded to the forward side of the shank 15 is a cylindrical pusher bar 21 which extends horizontally across the path of the conveyor in a manner best seen in FIG. 4.

The power drive chain located within the tube 10 comprises among the elements thereof rollers 22 having bearings 23 and being mounted for rotation about the pivot pin 24 which secures each roller to an endless chain 25. Adjacent each alternate roller 22 is secured, by means of pivot pin 24, a depending angle plate 26 and, likewise, secured adjacent to each alternate roller 22 is a second depending angle plate 27. To the end of the depending angle plate 26, secured by pivot pin 28, is a generally Z-shaped dog 31 having a hook 32, lengths 33 and 34 parallel to the conveyor tube 10, and length 35 extending perpendicularly thereto. In the top part of the length 35 of the dog 31 there is positioned a pin 36 which extends into a slot 37 formed in the depending angle plate 27. Immediately below the pin 36 at the opposite end of the length 35 of the dog 31, a pivot pin 38 is provided for the pivotal retention of a pawl 41. Immediately forward of the dog hook 32 are rollers 42 and 43.

Figure 3:
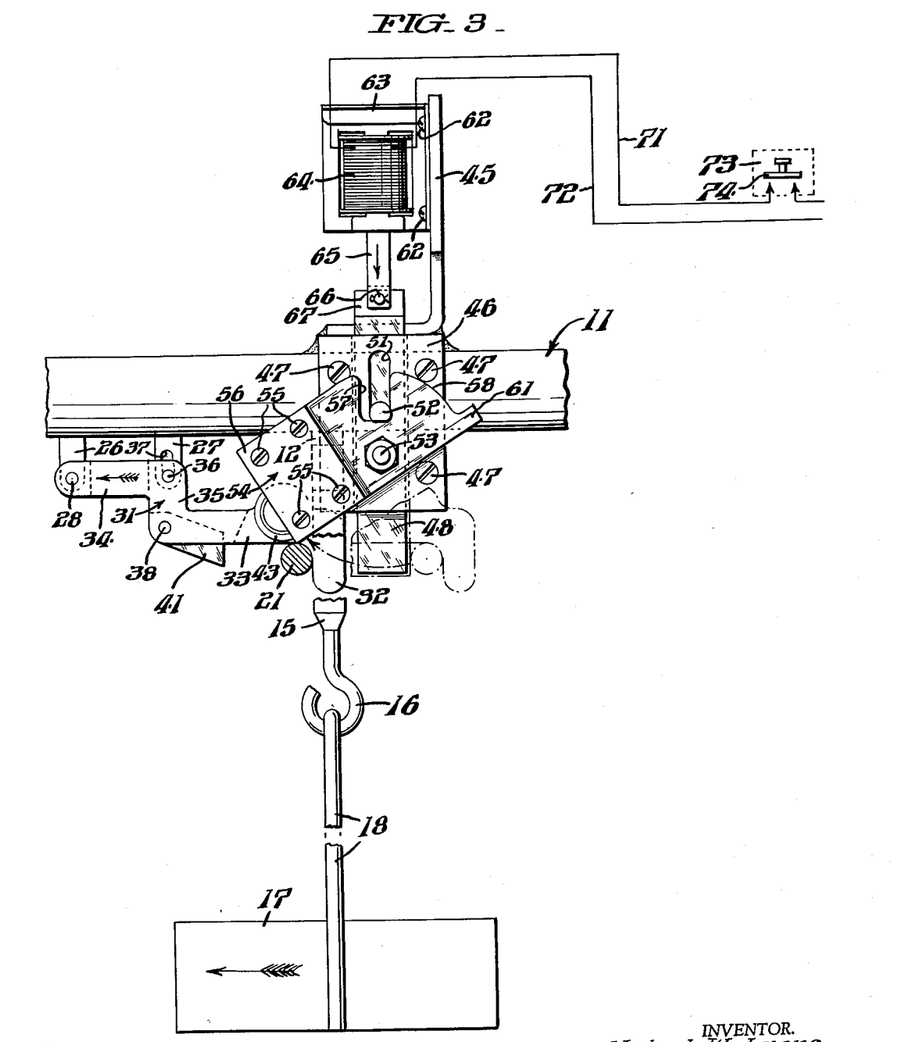
FIG. 3 is a view similar to FIGS. 1 and 2 showing a still different relationship of the parts of the conveyor system and stop and release mechanism as provided in accordance with this invention.
Figure 4:
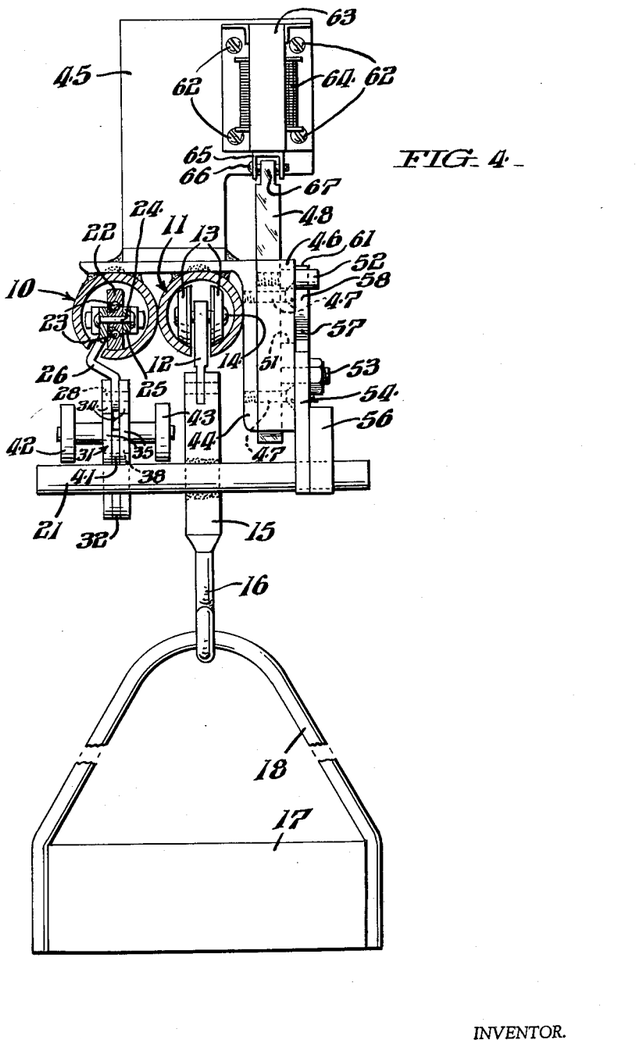
FIG. 4 is a view partly in section taken as indicated by the lines and arrows IV—IV in FIG. 2.

As may best be seen in FIG. 4, an L-shaped support frame 44 is welded to the tops of the conveyor tubes 10 and 11. To the top part of the L-shaped support frame 44 there is also welded a support stand 45. To the front of the L-shaped support frame 44 is affixed a plate 46 held in place by screws 47. The plate 46 is provided with a hollow central portion extending therethrough from top to bottom for the reception of a rectangular metal barrier or stop bar 48 which limits the movement of the carrier elements 12 and their depending hooks and baskets in a manner to be explained more fully hereinafter. The plate 46 is further provided with a longitudinal slot 51 in the front thereof for the reception of a pin 52 which is affixed to the stop bar 48. Immediately below the slot 51 in the plate 46, a bolt 53 pivotally secures a resetting cam 54, to the rectangular end of which there is attached by screws 55 a metal weight 56. As may best be seen in FIGS. 1 and 3, a slot 57 is provided in the upper portion of cam 54 for the reception of the pin 52 affixed to the stop bar 48 for a purpose and in a manner to be explained more fully hereinafter. The cam 54 is further provided with a curved edge 58 in the upper part thereof terminating in a projecting lug 61. The pin 52 is provided with a concave undersurface adapted to slide along the curved edge 58 of resetting cam 54 for a purpose and in a manner to be described more fully hereinafter.

Figure 1:
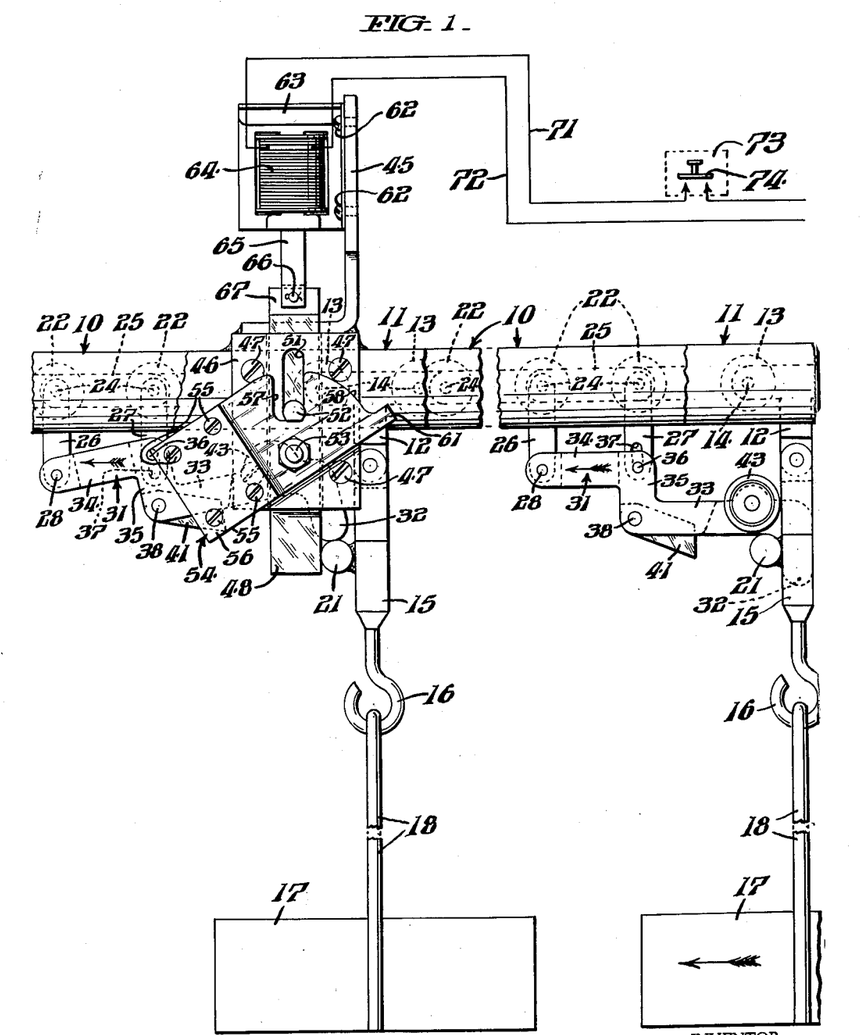
FIG. 1 is a side elevational view of a stop and release mechanism as provided in accordance with this invention, partly broken away in order better to illustrate the parts thereof.
Figure 2:
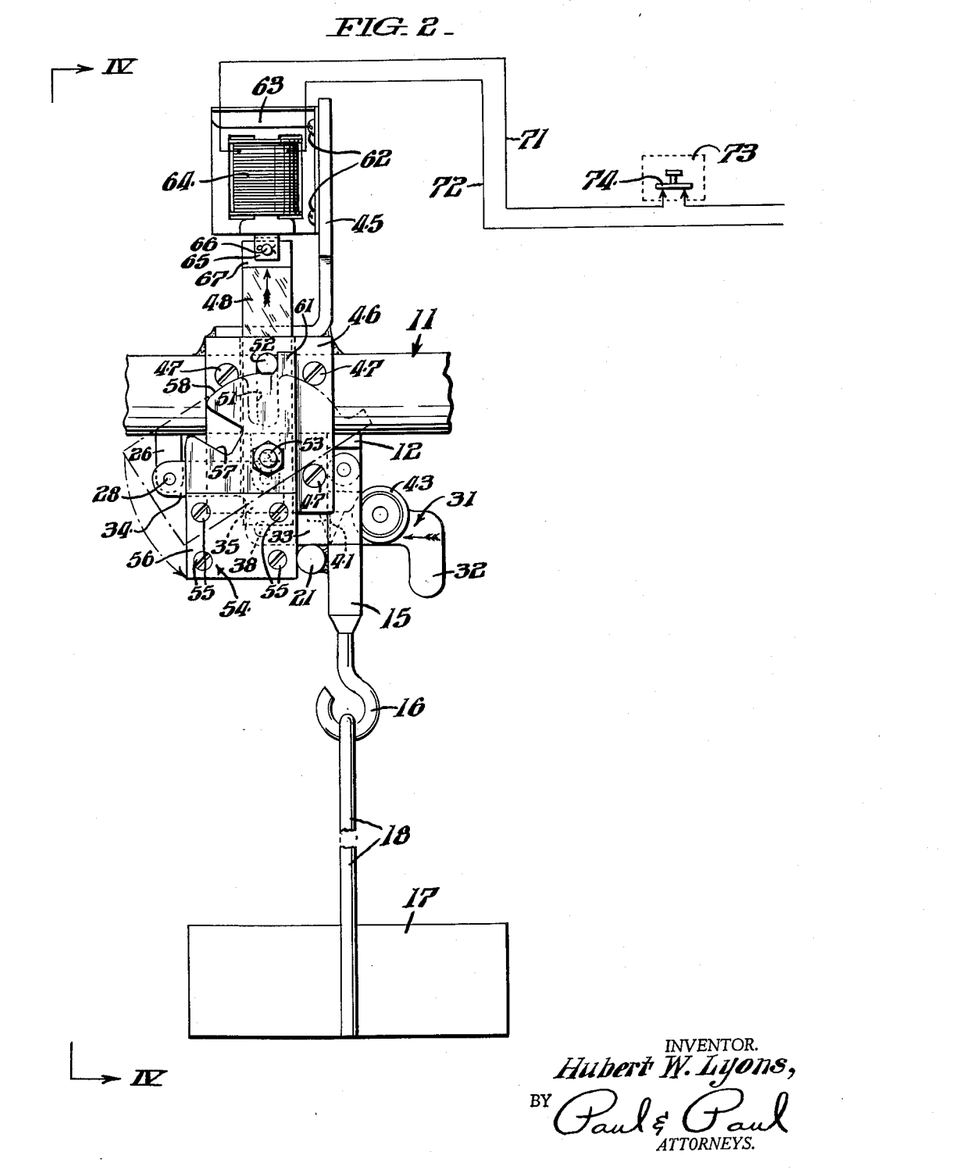
FIG. 2 is a view similar to FIG. 1 showing the stop and release mechanism in a different arrangement.

To the stand 45 located above tubes 10 and 11, there is secured by screws 62 a frame 63 containing a solenoid 64, the plunger 65 of which is secured by the pin 66 to the top edge 67 of the stop bar 48. Current conducting wires 71 and 72 carry electric current to the solenoid 64 from a power source, not shown, and a switch 73 having a contact plate 74 is provided in the circuit for the closing and opening thereof as illustrated in FIGS. 1–3.

Figure 5:
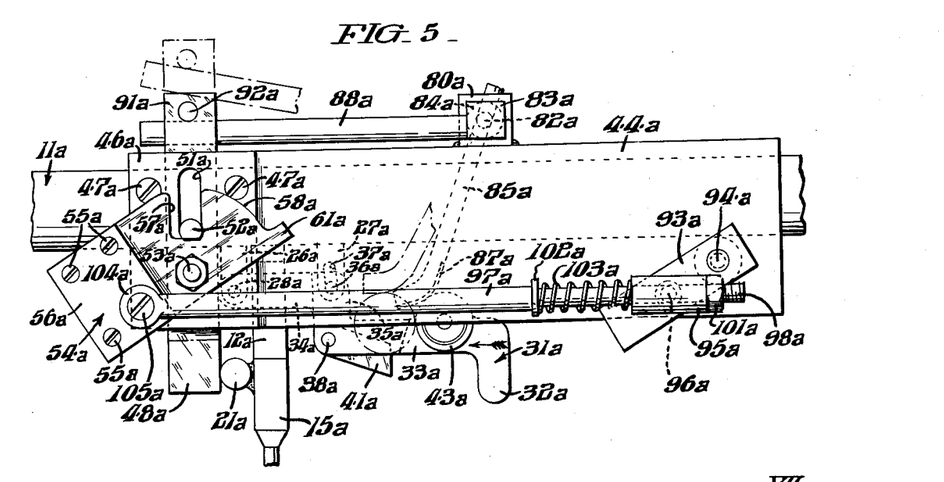
FIG. 5 is a view similar to FIG. 1 showing a modification of a stop and release mechanism as provided in accordance with this invention.
Figure 6:
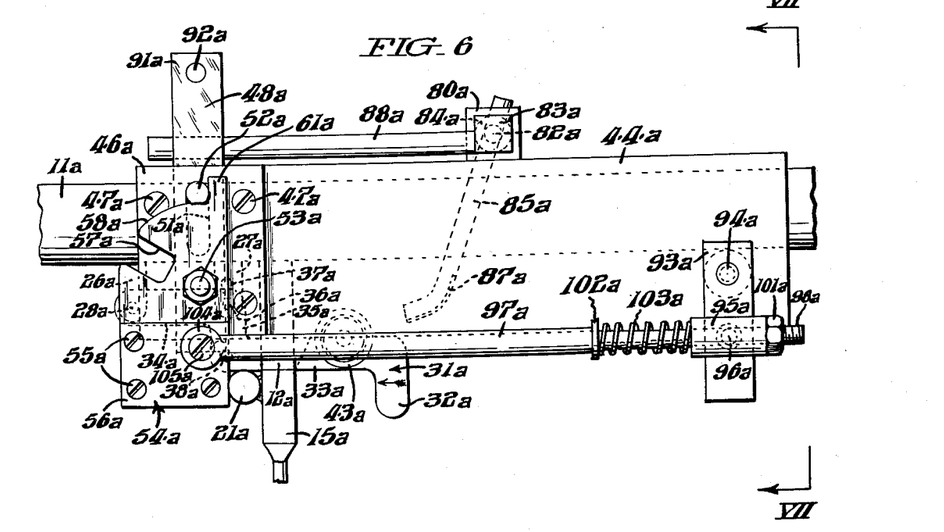
FIG. 6 is a view similar to FIG. 5 showing a different arrangement of a modified form of the invention.
Figure 7:
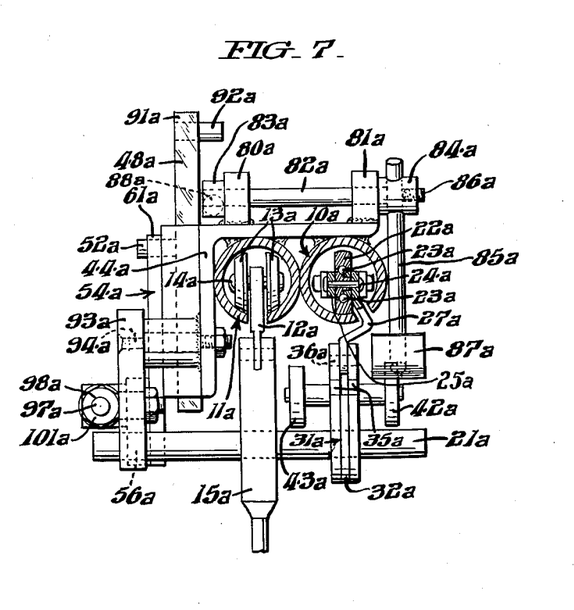
FIG. 7 is a view partly in section taken as indicated by the lines and arrows VII—VII in FIG. 6.

FIGS. 5–7 illustrate a modification of the stop and release mechanism as provided in accordance with this invention. As in the previously described form of the invention, within the tube 11a are a plurality of carrier elements 12a having at each end thereof a double roller 13a mounted for rotation on a pivot pin 14a. The carrier element 12a supports a depending hook element having a shank 15a. Welded to the forward side of the shank 15a is a cylindrical pusher bar 21a which extends horizontally across the line of movement of the conveyor, as illustrated in FIG. 7. Within the tube 10a the power drive chain comprises rollers 22a having bearings 23a. Each of the rollers 22a is mounted for rotation about the pivot pin 24a which secures said roller to an endless chain 25a. Adjacent each alternate roller 22a is secured by means of a pivot pin 24a a depending angle plate 26a and likewise secured adjacent each alternate roller 22a is a second depending angle plate 27a. To the end of the depending angle plate 26a there is secured by a pivot pin 28a a dog 31a having a hook 32a, lengths 33a and 34a parallel to the conveyor tube 10a and length 35a extending perpendicularly thereto. In the top part of the length 35a of the dog 31a there is positioned a pin 36a which extends into a slot 37a formed in the depending angle plate 27a. Immediately below the pin 36a at the opposite end of the length 35a of the dog 31a, a pivot pin 38a is provided for the pivotal retention of a pawl 41a. Immediately forward of the dog hook 32a are rollers 42a and 43a. As may best be seen in FIG. 7, an L-shaped support frame 44a is welded to the tubes 10a and 11a. To the front of the L-shaped support frame 44a is affixed a plate 46a held in place by screws 47a. The plate 46a is provided with a hollow central portion extending therethrough from top to bottom for the reception of a rectangular metal barrier 48a which limits the motion of the carrier element 12a and the depending hook shank 15a thereof. The plate 46a is further provided with a longitudinal slot 51a in the front thereof for the reception of a pin 52a which is affixed to the barrier bar 48a. Immediately below the slot 51a in the plate 46a a bolt 53a pivotally secures to said plate a resetting cam 54a, to the rectangular end of which there is attached by screws 55a a metal weight 56a. As may best be seen in FIGS. 5 and 6, a slot 57a is provided in the upper portion of the cam 54a for the reception of pin 52a affixed to the barrier bar 48a. The cam 54a is further provided with a curved edge 58a in the upper part thereof, terminating in a projecting lug 61a.

Mounted in the stands 80a and 81a welded to the top of the L-shaped frame 44a is a shaft 82a having blocks 83a and 84a at the distal ends thereof. Extending through a cylindrical hole in the block 84a is a trip lever 85a which is secured in position in the block 84a by screw 86a. As may best be seen in FIGS. 5 and 6, the trip lever 85a is curved at the distal end thereof and has welded thereto at that end, a relatively wider contact plate 87a. Affixed to the block 83a at the front end of the shaft 82a is a release lever 88a, the distal end of which extends beyond the barrier bar 48a. In the top end 91a of the barrier bar 48a is affixed a pin 92a which extends rearwardly of the aforesaid barrier bar for engagement with the release lever 88a in a manner to be explained more fully hereinafter.

To the front side of the frame 44a there is secured a rectangular metal plate 93a by means of a pivot pin 94a and to the aforesaid plate there is also secured a metal sleeve 95a by means of a second pivot pin 96a. Through the sleeve 95a there extends a bar 97a having a threaded end 98a for the accommodation of a nut 101a. As may be seen in FIGS. 5 and 6, the bar 97a is divided into sections of smaller and larger diameter which are separated by a barrier ring 102a and, mounted on a section of smaller diameter of said bar between the sleeve 95a and the barrier ring 102a, is a spring 103a. At the opposite end of the bar 97a there is formed a flat ring section 104a which is secured by a screw 105a to the resetting cam 54a.

*Operation*

In normal operation the drive chain 25 moves endlessly through the tube 10 carrying with it the rollers 22, depending angle plates 26 and 27, and the dog 31 mounted at the ends thereof. Normally, the dog hook 32 encounters the pusher bar 21 and as a result the hook 32 carries the bar 21 forward as the dog 31 moves forward in the conveyer system. As a consequence of the forward movement of the dog 31, therefore, the carrier element 12 is pulled along on its rollers 13 together with the depending hook 16 and basket 17. With the contact plate 74 of the switch 73 raised and the solenoid 64 de-energized, the plunger 65 of the solenoid is extended downward therefrom, thereby permitting the stop bar 48 to fall to the position shown in FIG. 1, wherein the pin 52 rests at the lowest extremity of the slot 51. It will be observed that when the stop bar 48 is in the position shown in FIG. 1, the resetting cam 54 is held in a tilted position by the positioning of the pin 52 in the slot 57 of the cam 54. By reason of the weight 56 attached to the rectangular end of the resetting cam 54, the cam is heavier at that end and, consequently, its tendency will be to assume an upright position since the center of gravity of the cam is located below the pivot 53. However, as shown in FIG. 1, the cam is maintained in its tilted position by means of the pin 52 which, upon entering the slot 57, restrains the movement of the cam toward a position of natural balance. With cam 54 and stop bar 48 in the position shown in FIG. 1, therefore, it will be evident that as the carrier element 12, shank 15 and pusher bar 21 are carried along by the dog 31 they will inevitably encounter an obstacle to their forward movement by reason of the contact of the stop bar 48 with the pusher bar 21, the path of which is intercepted because of the horizontal extension thereof, perpendicular to the direction of movement of the conveyor. Contact of the pusher bar 21 with the stop bar 48, therefore, stops the basket 17 in its forward movement which may then be loaded or unloaded as the case may be at the particular station at which the stop and release mechanism is located. It will be evident, of course, that stoppage of the forward movement of carrier element 12 and the hook and basket depending therefrom does not effect the forward movement of the power drive chain, the rollers 22, the depending angle plates 26 and 27 and the dog 31 mounted thereon. Owing to the pivotal mounting of the dog 31, the pull of the drive chain thereon causes the entire Z-shaped structure to pivot about the pin 28. The length of the slot 37 in the depending angle plate 27 limits the extent to which the dog is permitted to pivot about the pin 28, however, as may be seen from the drawings, when the pin 36 has reached the upper-most portion of the slot 37, the hook 32 has risen high enough to pass over the pusher bar 21 thereby enabling the dog 31 to continue in its forward movement, although the carrier element 12 and depending hook element with pusher bar 21 which the dog 31 has heretofore carried along has now been stopped by contact of pusher bar 21 with the stop bar 48. As shown in FIG. 1, as the dog 31 moves freely along its forward path carrying with it carrier element 12, hook 16 and basket 17 by reason of the hooked relationship of the dog with the pusher bar 21, the pawl 41 rests in a lowered position and serves as a limiting stop should the speed of the carrier element 12 and the hook and basket depending therefrom become, for some reason, greater than the forward speed of the drive chain 25 and dog 31. By this means, the forward movement of the basket 17 is at all times kept under control, notwithstanding that the conveyor may be going downhill as a whole.

With one carrier element 12 and depending hook and basket stopped behind the stop bar 48 for a sufficient length of time, it is possible that another dog 31, carrying with it still another hook and basket, will approach the first. When this occurs, the second basket will steadily approach the first basket until contact is made, at which time the forward movement of carrier 12 on its rollers 13 will be stopped by the blockage. The effect of the stoppage, in such a case, is exactly the same as the effect of stoppage by the stop bar itself, and, the hook 32 of the dog 31 will by reason of the pull of the drive chain 25 rise and pass over the pusher bar of the second hook and basket in exactly the same manner as described in the case of the first hook and basket stopped by the stop bar 48. The dog, which heretofore carried along the second hook and basket, will continue in its forward movement and when the hook 32 thereof encounters the pusher bar 21 of the first hook and basket adjacent the stop bar 48 it will again rise and pass over said pusher bar to continue in its forward movement. It will be clear that an indeterminate number of carrier elements and depending hooks and baskets can accumulate in this fashion, one behind the other, stopped in their forward movement by the stop bar 48 while the individual dogs which had heretofore pulled along the aforesaid hooks and baskets will successively rise and pass over the pusher bars of each preceding depending hook and basket without any interruption in the forward movement thereof or of the conveyor of which they are a part.

When it is desired to permit the conveyor once again to move the stopped hook and basket forward, the contact plate 74 is lowered to close the switch 73, as shown in FIG. 2. Upon closing of the switch, the solenoid 64 is energized, thereby pulling up the plunger 65 and causing the stop bar 48 to rise through the plate 46 until the pin 52 reaches the top of the slot 51. Moved in this manner, the pin 52 leaves the open slot 57 of the resetting cam 54 thereby permitting the cam to turn about the pivot 53 until the projecting lug 61 strikes the pin 52. It will be clear that the resetting cam in this position rests with the lower rectangular weighted portion thereof in front of the pusher bar 21 and with the top curved edge 58 thereof immediately underneath the pin 52 thereby preventing the stop bar 48 from falling into its lower position through the plate 46 even though the contact plate 74 of the switch 73 may be raised and the solenoid de-energized. As a dog 31 now comes along carried forward by the pull of the endless chain 25 on the rollers 22 of the tube 10, the lowered pawl 41 will, of course, rise as it passes over pusher bar 21 and the dog will continue forward until the hook 32 comes into contact with the aforesaid pusher bar. Since now the only obstacle in front of the pusher bar 21 is the weighted portion of the resetting cam 54, the pull of the dog 31 on the pusher bar will cause the carrier element 12 on its rollers 13 to begin to move forward through the conveyor tube 11 carrying along the depending hook 16 and basket 17. As the pusher bar 21 moves forward, however, force exerted against the weighted end of the re-setting cam 54 will cause the cam to pivot and the curved surface thereof to slide under the pin 52 until the tilted position of the cam is reached, as shown by the dotted lines of FIG. 2, in which the open slot 57 of the cam 54 is directly beneath the pin 52. Having tilted the resetting cam 54, as aforedescribed, the pusher bar together with the hook 16 and basket 17 continue on their way forward carried along by the dog 31. At the same time, with the contact plate 74 of the switch 73 raised and the solenoid 64 de-energized, as shown in FIG. 3, the weight of the stop bar 48 will cause it to fall through the plate 46 with the pin 52 sliding into the slot 57 of the tilted resetting cam 54. In the position described, the stop and release mechanism is again positioned to stop the next following carrier element and depending hook and basket, as indicated by the dotted lines of FIG. 3.

In the modified form of the stop and release mechanism, as provided in accordance with this invention, when a carrier element 12a and its depending shank 15a and pusher bar 21a have been stopped by the contact of the aforesaid bar with the stop bar 48a, the release lever 88a is normally in a horizontal position and the trip lever 85a normally in the position indicated by the dotted lines of FIGS. 5 and 6. As a dog 31a is carried forward by the endless chain 25a in the tube 10a, the roller 42a affixed to the aforesaid dog will encounter the contact plate 87a attached to the rear of the curved end of the trip lever 85a and thereby push the aforesaid trip lever forward as the roller passes therebeneath. Forward movement of the trip lever 85a causes the release lever 88a to rise and upon making contact with the pin 92a in the top 91a of the stop bar 48a, pull the aforesaid stop bar upward through the plate 46a until the pin 52a reaches the top of the slot 51a. The weight 56a then causes the cam 54a to turn in a counter-clockwise direction about the pivot 53a until the projecting lug 61a strikes the pin 52a which is then supported by the curved surface 58a of the resetting cam. With the resetting cam 54a positioned as aforedescribed, the stop bar 48a is maintained in its raised position as shown in FIG. 6. With the stop bar 48a raised, the forward moving dog 31a, which has tripped the lever 87a, now engages the pusher bar 21a at the hooked end 32a thereof and pulls the pusher bar, together with its attendant hook shank 15a forward and, at the same time, causes the pusher bar 21a, as a consequence of the forward pull thereof, to push the weighted end of the resetting cam 54a forward, tilting the aforesaid cam once again so that the slot 57a is revolved into position beneath the pin 52a. As the pin 52a slides into the open slot 57a, the stop bar 48a again falls into its original position as shown in FIG. 5 and will stop the next forward moving carrier and shank upon contact with the pusher bar thereof.

The bar 97a, pivoted at one end to the resetting cam 54a and at the other end to the pivoting plate 93a, is provided for the adjustment of the cam 54a in order to assure that, upon the tilting thereof, the open slot 57a coincides in position with the pin 52a. Adjustment of the position of resetting cam 54a is effected by rotation of the nut 101a in a clockwise direction, whereby the lower part of the cam 54a tends to be pulled rearward and the projecting lug 61a forced forward against the pin 52a. Should adjustment be required in the opposite direction, nut 101a is turned in the counterclockwise direction causing the projecting lug 61a to move in a rearward direction away from the pin 52a so that upon the tilting of the cam 54a the slot 57a will fall directly beneath the pin 52a.

It will be appreciated that although the specific embodiment of the modified form of the stop and release mechanism, as provided in accordance with this invention and illustrated in FIGS. 5-7, has been described with reference to a trip lever for the actuation of a release lever to raise the stop bar 48a, the invention is in no way limited to such an arrangement. On the contrary, manual means such as a pull cord, or the like, may equally easily be used to lift the aforesaid stop bar.

Although not illustrated in the specific embodiment of the invention, it will be further appreciated that spring returns may be provided for the resetting cam, the stop bar and activator thereof, so that the stop and release mechanism may be used in any position both horizontally and vertically.

It will also be appreciated, of course, that the stop and release mechanism as provided in accordance with this invention may be used with any type of carrier or depending element which moves on a chain conveyor of the type described, and is not limited to the particular form and type illustrated in the specific embodiments of the invention.

It will be apparent, too, that a very important advantage of the invention is realized in the elimination of any need for precision parts, or precision fitting thereof, in the construction of the stop and release mechanism as provided in accordance with the invention. For example, the resetting cam, the stop bar, the mounting plate, and other related parts may be produced with appreciable tolerance in the dimensions thereof, thereby reducing machinery costs, maintenance costs, and the like.

Another important advantage of the invention lies in the manner in which the movement of individual elements carried by the conveyor may be selectively started or stopped without removal from the conveyor and without interruption of the steady forward progress thereof.

A still further advantage of the invention is realized in the easy adaptability of the stop and release mechanism to either electrical, mechanical or manual operation.

Although this invention has been described with reference to specific forms and embodiments thereof, it will be evident that a great number of variations may be made without departing from the spirit and the scope of this invention. For example, parts may be reversed, equivalent elements may be substituted for those specifically disclosed, and certain features of the invention may be used independently of other features, all without departing from the spirit and scope of this invention as defined in the appended claims.

Having thus described my invention, I claim:

1. Article handling means comprising a moving conveyor adapted to transport individual articles and including individual forwarding elements, said elements being arranged to pivot and disengage automatically for continued forward movement when an article is stopped, a mounting affixed to said conveyor, barrier means movably carried on said mounting and arranged to intercept and stop said articles while said forwarding elements disengage therefrom and continue their forward movement, actuator means connected to move said barrier means, and imbalanced cam means affixed to said mounting and arranged for pivoting to hold said barrier means out of the path of said articles upon activation of said actuator means and to reset said barrier means in the path of said articles after deactivation of said actuator means.

2. A stop and release mechanism for articles which are being carried by an endless chain conveyor and which are arranged for movement therealong by individual forwarding elements depending from said chain comprising a mounting plate affixed to said conveyor, a stop bar mounted for reciprocal movement through said plate into and out of the path of said articles whereby said articles are stopped and released, said forwarding elements being arranged to pivot and disengage from said articles when said articles are stopped, actuator means connected to an end of said stop bar for moving said stop bar from the path of said articles, and cam means pivoted to said mounting plate for holding said stop bar out of the path of said articles upon activation of said actuator means and to reset said stop bar in the path of said articles when turned by said forward moving article.

3. A stop and release mechanism for articles being carried by an endless chain conveyor and arranged for movement therealong by individual forwarding elements depending from said chain comprising a mounting plate affixed to said conveyor, a stop bar mounted for reciprocal movement through said plate into and out of the path of said articles whereby said articles are stopped and released, said forwarding elements being arranged to disengage from said articles when said articles are stopped and to continue the forward movement thereof, a resetting cam pivoted to said mounting plate, said cam having a weight affixed to one end thereof, said weight being arranged to pivot said cam into a position wherein said cam supports said stop bar out of the path of said articles, said cam being arranged to pivot out of said supporting position to a tilted position when pushed forward at the weighted end thereof by a depending forwarding element whereby said stop bar is released to intercept the path of said articles, and actuator means for moving said stop bar through said plate.

4. A stop and release mechanism for articles being carried by an endless chain conveyor and arranged for movement therealong by individual forwarding elements depending from said chain comprising a mounting plate affixed to said conveyor, a stop bar mounted for reciprocal movement through said plate into and out of the path of said articles whereby said articles are stopped and released, said forwarding elements being arranged to disengage from said articles when said articles are stopped and to continue the forward movement thereof, a resetting cam pivoted to said mounting plate, said cam having a weight affixed to one end thereof, said weight being arranged to pivot said cam into a position wherein said cam supports said stop bar out of the path of said articles, said cam being arranged to pivot out of said supporting position to a tilted position when pushed forward at the weighted end thereof by a depending forwarding element, whereby said stop bar is released to intercept the path of said articles, a lift lever positioned above said conveyor and arranged to engage the top of said stop bar, and a trip lever connected to said lift lever and arranged for pivotal movement by a depending element of said conveyor, whereby said lift lever is caused to raise said stop bar and release said article for forward movement with said conveyor.

5. A stop and release mechanism for articles being carried by an endless chain conveyor and arranged for movement therealong by individual forwarding elements depending from said chain comprising a mounting plate affixed to said conveyor, a stop bar mounted for reciprocal movement through said plate into and out of the path of said articles whereby said articles are stopped and released, said forwarding elements being arranged to disengage from said articles when said articles are stopped and to continue the forward movement thereof, a resetting cam pivoted to said mounting plate, said cam having a weight affixed to one end thereof, said weight being arranged to pivot said cam into a position wherein said cam supports said stop bar out of the path of said articles, said cam being arranged to pivot out of said supporting position to a tilted position when pushed forward at the weighted end thereof by a depending forwarding element whereby said stop bar is released to intercept the path of said following articles, a solenoid disposed adjacent said stop bar, said solenoid having a plunger connected to an end of said stop bar and adapted to reciprocal movement when said solenoid is energized and de-energized, circuit means connected to said solenoid for conducting electric current thereto, and switch means for the opening and closing thereof.

6. The mechanism defined in claim 5 wherein said stop bar is moved out of the path of said articles when said solenoid is energized.

7. A stop and release mechanism for articles being carried by an endless chain conveyor having forwarding elements depending therefrom comprising a mounting plate affixed to said conveyor and arranged for the support of a resetting cam pivoted thereto, said cam having a weighted lower end and a slotted upper end, said cam being arranged to pivot to a tilted position when said lower end is pushed forward by a depending forwarding element, a stop bar mounted for reciprocal movement through said plate and arranged to abut against and stop the forward movement of said articles when farthest extended therethrough, said stop bar having a pin affixed to the surface thereof and arranged to extend through a slot in said mounting plate, said pin being arranged to extend into said slot in said cam and to hold said cam in a tilted position when said stop bar is farthest extended through said plate and to slide out of said slot and release said cam when said stop bar is least extended through said plate, said cam being arranged to pivot when released by said pin so that said upper end thereof moves beneath said pin and constrains the movement of said pin and stop bar, and actuator means connected to said stop bar for moving said stop bar backward and forward through said plate.

8. A stop and release mechanism for articles carried by an endless chain conveyor comprising a mounting plate affixed to said conveyor and arranged for the support of a resetting cam pivoted thereto, said cam having a lower end and a slotted upper end, said upper end having a curved edge terminating in a projecting lug, a stop bar mounted for reciprocal movement through said plate and arranged to abut against and stop the forward movement of said articles when farthest extended therethrough, said stop bar having a pin affixed to the surface thereof and arranged to extend through a slot in said mounting plate, said pin being arranged to extend into said slot in said cam and to hold said cam in a tilted position when said stop bar is farthest extended through said plate and to slide out of said slot and release said cam when said stop bar is least extended through said plate, said cam being arranged to pivot when released by said pin so that said curved upper edge thereof moves beneath said pin and constrains the movement of said pin and said stop bar, a solenoid disposed adjacent said stop bar, said solenoid having a plunger connected to an end of said stop bar and adapted to reciprocal movement when said solenoid is energized and de-energized, circuit means connected to said solenoid for conducting electric current thereto, and switch means for the opening and closing thereof.

9. A stop and release mechanism for articles carried by an endless chain conveyor comprising a mounting plate affixed to said conveyor and arranged for the support of a resetting cam pivoted thereto, said cam having a weighted lower end and a slotted upper end, a stop bar mounted for up-and-down movement through said plate and arranged to abut against and stop the forward movement of said articles when extended farthest downward through said plate, said stop bar having a pin affixed to the surface thereof and arranged to extend through a slot in said mounting plate, said pin being arranged to extend into said slot in said cam and to hold said cam in a tilted position when said stop bar is extended farthest downward through said plate and to slide out of and release said cam when said stop bar is least extended downward through said plate, said cam being arranged to pivot when released so that said upper end thereof moves beneath said pin and constrains the downward movement of said pin and said stop bar, and actuator means connected to said stop bar whereby said stop bar is caused to rise and release said article for forward movement with said conveyor as the next of said articles moves toward said stop and release mechanism.

10. A stop and release mechanism for articles carried by an endless chain conveyor comprising a mounting plate affixed to said conveyor and arranged for the support of a resetting cam pivoted thereto, said cam having a weighted lower end and a slotted upper end, said upper end being formed with a curved edge thereto, a stop bar mounted for up-and-down movement through said plate and arranged to abut against and stop the forward movement of said articles when extended farthest downward through said plate, said stop bar having a pin affixed to the surface thereof and arranged to extend through a slot in said mounting plate, said pin being arranged to extend into said slot in said cam and to hold said cam in a tilted position when said stop bar is extended farthest downward through said plate and to slide out of and release said cam when said stop bar is least extended downward through said plate, said cam being arranged to pivot when released so that said curved upper edge thereof moves beneath said pin and constrains the downward movement of said pin and said stop bar, a lift lever positioned above said conveyor and arranged to engage a pin at the top of said stop bar, a trip lever connected to said lift lever and arranged for pivotal movement by a depending element of said conveyor, whereby said lift lever is caused to raise said stop bar and release said article for forward movement with said conveyor.

11. A stop and release mechanism for articles carried by an endless chain conveyor comprising a mounting plate affixed to said conveyor and arranged for the support of a resetting cam pivoted thereto, said cam having a weighted lower end and a slotted upper end, said upper end being formed with a curved edge thereto, a stop bar mounted for up-and-down movement through said plate and arranged to abut against and stop the forward movement of said articles when extended farthest downward through said plate, said stop bar having a pin affixed to the surface thereof and arranged to extend through a slot in said mounting plate, said pin being arranged to extend into said slot in said cam and to hold said cam in a tilted position when said stop bar is extended farthest downward through said plate and to slide out of and release said cam when said stop bar is least extended downward through said plate, said cam being arranged to pivot when released so that said curved upper edge thereof moves beneath said pin and constrains the downward movement of said pin and said stop bar, a lift lever positioned above said conveyor and arranged to engage a pin at the top of said stop bar, a trip lever connected to said lift lever and arranged for pivotal movement by a depending element of said conveyor, whereby said lift lever is caused to raise said stop bar and release said article for forward movement with said conveyor, and an adjuster bar pivotally secured to said mounting plate and to said cam and arranged to position said slot in said cam in alignment with said pin of said stop bar.

12. In an article handling apparatus including an endless conveyor comprising in combination a plurality of carrier elements arranged for movement along the path of said conveyor, an endless chain arranged for continuous forward movement and having a plurality of forwarding elements suspended therefrom, said forwarding elements being arranged individually to engage and carry along said carrier elements, the combination which comprises barrier means positioned adjacent the path of said conveyor and arranged for reciprocal movement into and out of the path of said carrier elements whereby said elements are stopped and released, actuator means connected to said barrier means and arranged for the movement thereof, cam means positioned adjacent said barrier means and arranged to hold said barrier means out of the path of said carrier elements upon activation of said actuator means and to reset said barrier means after de-activation of said actuator means.

13. In an article handling apparatus including an endless conveyor comprising in combination a plurality of carrier elements arranged for movement along the path of said conveyor, an endless chain arranged for continuous forward movement and having a plurality of forwarding elements suspended therefrom, said forwarding elements being pivotally mounted at the forward end thereof and arranged individually to engage and carry along said carrier elements, the combination which comprises a mounting plate affixed to said conveyor, barrier means positioned adjacent the path of said conveyor and arranged to intercept and stop said carrier elements, said forwarding elements being arranged to pivot and disengage from said carrier elements when said carrier elements are stopped, actuator means connected to said barrier means and arranged for the movement thereof, means for holding said barrier means out of the path of said carrier elements upon activation of said actuator means and to reset said barrier means in the path of said carrier elements after de-activation of said actuator means.

14. In an article handling apparatus including an endless conveyor comprising in combination a plurality of carrier elements suspended from said conveyor, said carrier elements having a pusher bar affixed thereto, said pusher bar being arranged to extend across the path of said conveyor, an endless chain arranged for continuous forward movement and having a plurality of forwarding elements suspended therefrom, said forwarding elements being pivotally mounted at the forward end thereof and having a hook at the rearward end thereof, said forwarding elements being arranged to hook said pusher bar and carry along the carrier elements thereof and to pivot and pass over said pusher bar when said pusher bar is stopped, the combination which comprises a stop bar mounted adjacent the path of said conveyor and arranged for reciprocal movement into and out of the path of said pusher bar whereby said carrier elements are stopped and released, actuator means connected to an end of said stop bar for moving said stop bar from the path of said pusher bar and pivotal cam means positioned adjacent said stop bar and arranged to hold said stop bar out of the path of said pusher bar, and to reset said stop bar for interception of the next following carrier element when tilted by said forward moving pusher bar.

15. In an article handling apparatus including an endless conveyor comprising in combination a pair of parallel tubes in side-by-side relationship, a plurality of carrier elements disposed upon rollers within one of said tubes, said carrier elements being arranged for the support of a hook and basket depending therefrom, said hook having a pusher bar affixed to the shank thereof and arranged to extend across the path of said conveyor, an endless chain arranged for continuous forward movement within the other of said tubes, said chain having a plurality of rollers secured thereto and arranged to be carried forward therewith, said rollers having metal plates depending from the axes thereof for the support of a generally Z-shaped depending dog attached thereto, said dog being pivotally mounted at the forward end thereof and having a hook at the rearward end thereof, said dog having a pivotal pawl secured thereto intermediate said forward and rearward ends, said dog hook being arranged to engage said pusher bar and carry along the carrier elements thereof and said hook and basket depending therefrom, the combination which comprises a mounting plate affixed to said conveyor tubes and arranged for the support of a resetting cam pivoted thereto, said cam having a weighted lower end and a slotted upper end, said upper end having a curved edge terminating in a projecting lug, a stop bar mounted for reciprocal movement through said plate and arranged to abut against and stop the forward movement of said pusher bar when farthest extended therethrough, said stop bar having a pin affixed to the surface thereof and arranged to extend through a slot in said mounting plate, said pin being arranged to extend into said slot in said cam and to hold said cam in a tilted position when said stop bar is farthest extended through said plate and to slide out of said slot and release said cam when said stop bar is least extended therethrough said cam being arranged to pivot when released by said pin so that said curved upper edge thereof moves beneath said pin and constrains said pin from movement in said slot in said plate, and actuator means for moving said stop bar backward and forward through said plate.

16. In an article handling apparatus including an endless conveyor comprising in combination a pair of parallel tubes in side-by-side relationship, a plurality of carrier elements disposed upon rollers within one of said tubes, said carrier elements being arranged for the support of a hook and basket depending therefrom, said hook having a pusher bar affixed to the shank thereof and arranged to extend across the path of said conveyor, an endless chain arranged for continuous forward movement within the other of said tubes, said chain having a plurality of rollers secured thereto and arranged to be carried forward therewith, said rollers having metal plates depending from the axes thereof for the support of a generally Z-shaped depending dog attached thereto, said dog being pivotally mounted at the forward end thereof and having a hook at the rearward end thereof, said dog having a pivotal pawl secured thereto intermediate said forward and rearward ends, said dog hook being arranged to engage said pusher bar and carry along the carrier elements thereof and said hook and basket depending therefrom, the combination which comprises a mounting affixed to said conveyor tubes and arranged for the support of a resetting cam pivoted thereto, said cam having a weighted lower end and a slotted upper end, said cam being arranged to pivot to a tilted position when said weighted end thereof is pushed forward by said pusher bar, said upper end of said cam having a curved edge terminating in a projecting lug, a stop bar mounted for reciprocal movement through said plate and arranged to abut against and stop the forward movement of said pusher bar when farthest extended therethrough, said stop bar having a pin affixed to the surface thereof and arranged to extend through a slot in said mounting plate, said pin being arranged to extend into said slot in said cam and to hold said cam in a tilted position when said stop bar is farthest extended through said plate and to slide out of said slot and release said cam when said stop bar is least extended through said plate, said cam being arranged to pivot when released by said pin so that said curved upper edge thereof moves beneath said pin and constrains said pin from movement in said slot in said plate, a solenoid disposed adjacent said stop bar, said solenoid having a plunger connected to an end of said stop bar and adapted to reciprocal movement when said solenoid is energized and de-energized, circuit means connected to said solenoid for conducting electric current thereto and switch means connected to said circuit means for the opening and closing thereof.

17. In an article handling device including an endless conveyor comprising in combination a pair of parallel tubes in side-by-side relationship, a plurality of carrier elements disposed upon rollers within one of said tubes, said carrier elements being arranged for the support of a hook and basket depending therefrom, said hook having a pusher bar affixed to the shank thereof and arranged to extend across the path of said conveyor, an endless chain arranged for continuous forward movement within the other of said tubes, said chain having a plurality of rollers secured thereto and arranged to be carried forward therewith, said rollers having metal plates depending from the axes thereof for the support of a generally Z-shaped depending dog attached thereto, said dog being pivotally mounted at the forward end thereof and having a hook at the rearward end thereof, said dog having a pivotal pawl secured thereto intermediate said forward and rearward ends, said dog hook being arranged to engage said pusher bar and carry along the carrier elements thereof and said hook and basket depending therefrom, the combination which comprises a mounting plate affixed to said conveyor tubes and arranged for the support of a resetting cam pivoted thereto, said cam having a weighted lower end and a slotted upper end, said upper end having a curved edge terminating in a projecting lug, a stop bar mounted for reciprocal movement through said plate and arranged to abut against and stop the forward movement of said pusher bar when farthest extended therethrough, said stop bar having a pin affixed to the surface thereof and arranged to extend through a slot in said mounting plate, said pin being arranged to extend into said slot in said cam and to hold said cam in a tilted position when said stop bar is farthest extended through said plate and to slide out of said slot and release said cam when said stop bar is least extended through said plate, said cam being arranged to pivot when released by said pin so that said curved upper edge thereof moves beneath said pin and constrains said pin from movement in said slot in said plate, a lift lever positioned above said mounting plate and arranged to engage and raise said stop bar, a trip lever connected to said lift lever and arranged for pivotal movement by a depending element of said conveyor, whereby said lift lever is caused to raise said stop bar and release said article for forward movement with said conveyor.

18. In an article handling apparatus for articles that are movable along a predetermined course, an article controlling mechanism comprising a stop member movable into and out of the course of movement of said articles, means forming a projection extending from said stop member, means for limiting the movement of said projection to a predetermined path, a tiltable member having an arcuate projection stop thereon, said tiltable member being operable automatically upon movement of said projection in its predetermined path to swing through a forward arc to bring said arcuate projection stop adjacent to said projection to lock said projection against movement in a direction opposite to said predetermined direction, and means for automatically swinging said tiltable member in a reverse arc to unlock and release said projection.

19. In an article handling apparatus for articles that are movable along a predetermined course, an article controlling mechanism comprising a stop member movable into and out of the course of movement of said articles, means forming a projection extending from said stop member, means for limiting the movement of said projection to a predetermined path, a tiltable member having an arcuate projection stop thereon, said arcuate stop having an open slot formed therein, said tiltable member being operable automatically upon movement of said projection in its predetermined path to swing through a forward arc to bring said arcuate projection stop adjacent to said projection to lock said projection against movement in a direction opposite to said predetermined direction, and means for automatically swinging said tiltable member in a reverse arc to allow said projection to enter said slot whereby said stop member moves into the course of movement of said articles.

20. In an article handling apparatus for articles that are movable along a predetermined course, an article controlling mechanism comprising a stop member movable into and out of the course of movement of said articles, means forming a projection extending from said stop member, means for limiting the movement of said projection to a predetermined path, a tiltable member having a weight at one end thereof and an arcuate projection stop at the opposite end thereof, said stop having an open slot formed therein, said tiltable member being operable automatically upon movement of said projection in its predetermined path to swing by the force of gravity through an arc to bring said arcuate projection stop adjacent said projection to lock said projection against movement, and means for automatically swinging said tiltable member in a reverse arc to allow said projection to enter said slot and move in the opposite direction of the predetermined path thereof.

References Cited in the file of this patent

UNITED STATES PATENTS

| | | |
|---|---|---|
| 2,572,011 | Cohen et al. | Oct. 23, 1951 |
| 2,619,370 | Leger | Nov. 25, 1952 |
| 2,619,916 | Rainier | Dec. 2, 1952 |
| 2,635,555 | Hansson | Apr. 21, 1953 |
| 2,812,724 | King | Nov. 12, 1957 |
| 2,883,942 | Johnson | Apr. 28, 1959 |
| 2,885,969 | Kay et al. | May 12, 1959 |
| 2,950,688 | King | Aug. 30, 1960 |
| 2,956,514 | Bishop | Oct. 18, 1960 |